US011118390B2

(12) United States Patent
Mueller et al.

(10) Patent No.: US 11,118,390 B2
(45) Date of Patent: Sep. 14, 2021

(54) RAIL SLIDER FOR A CABLE-TYPE WINDOW LIFTER OF A MOTOR VEHICLE

(71) Applicant: Brose Fahrzeugteile GmbH & Co. Kommanditgesellschaft, Bamberg, Bamberg (DE)

(72) Inventors: Joerg Mueller, Bamberg (DE); Christian Dallos, Poruba (SK); Udo Taubmann, Bad Rodach (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 150 days.

(21) Appl. No.: 16/471,236

(22) PCT Filed: Dec. 19, 2017

(86) PCT No.: PCT/EP2017/083474
§ 371 (c)(1),
(2) Date: Jun. 19, 2019

(87) PCT Pub. No.: WO2018/114904
PCT Pub. Date: Jun. 28, 2018

(65) Prior Publication Data

US 2020/0386027 A1 Dec. 10, 2020

(30) Foreign Application Priority Data

Dec. 19, 2016 (DE) ......................... 202016107095.3

(51) Int. Cl.
*B60J 1/16* (2006.01)
*E05F 11/38* (2006.01)
*E05F 11/48* (2006.01)

(52) U.S. Cl.
CPC .......... *E05F 11/385* (2013.01); *E05F 11/483* (2013.01); *E05F 2011/387* (2013.01); *E05Y 2900/55* (2013.01)

(58) Field of Classification Search
CPC . E05F 11/385; E05F 11/483; E05F 2011/387; E05Y 2900/55
USPC ........................................... 49/352, 374, 375
See application file for complete search history.

(56) References Cited

U.S. PATENT DOCUMENTS 5,546,704 A * 8/1996 Maruoka .................... B60J 1/17 49/375
5,778,599 A * 7/1998 Saito ..................... E05F 11/385 49/375
5,992,099 A * 11/1999 Thomas ................ E05F 11/385 49/375

(Continued)

FOREIGN PATENT DOCUMENTS

DE 4423440 A1 2/1995
DE 20202551 U1 6/2002

(Continued)

*Primary Examiner* — Jerry E Redman
(74) *Attorney, Agent, or Firm* — Brooks Kushman, P.C.

(57) ABSTRACT

A rail slide may include a base member having guiding faces for the guide rail of the cable-type window lifter and a curved retention member which is connected via a base to the base member in a resilient manner and which has a locking hook which is arranged at the upper end. The curved retention member has two lateral webs which are connected to the base and a transverse connection element which carries the locking hook.

19 Claims, 4 Drawing Sheets

(56) References Cited

U.S. PATENT DOCUMENTS

| | | | | |
|---|---|---|---|---|
| 9,522,447 | B2 * | 12/2016 | Reinke | E05F 11/385 |
| 9,822,571 | B2 * | 11/2017 | Reinke | E05F 11/385 |
| 10,246,926 | B2 * | 4/2019 | Lagenstroeer | B60J 1/004 |
| 10,876,344 | B2 * | 12/2020 | Taubmann | E05F 11/483 |
| 2006/0130407 | A1 * | 6/2006 | Castellon | E05F 11/385 49/375 |
| 2007/0006533 | A1 * | 1/2007 | Dedrich | E05F 11/385 49/375 |
| 2008/0244981 | A1 * | 10/2008 | Arimoto | E05F 11/385 49/352 |
| 2009/0193718 | A1 * | 8/2009 | Tudora | E05F 11/385 49/358 |
| 2010/0088964 | A1 * | 4/2010 | Costigan | E05F 11/385 49/372 |
| 2010/0313481 | A1 * | 12/2010 | Brownlie, Jr. | E05F 11/385 49/372 |
| 2013/0152476 | A1 * | 6/2013 | Reno | E05F 11/385 49/348 |

FOREIGN PATENT DOCUMENTS

| | | | |
|---|---|---|---|
| DE | 102009047857 | A1 | 5/2010 |
| DE | 102009033466 | A1 | 1/2011 |
| DE | 102012223825 | A1 | 7/2013 |
| DE | 102014204361 | A1 | 9/2015 |
| EP | 0208237 | A1 | 1/1987 |

* cited by examiner

RAIL SLIDER FOR A CABLE-TYPE WINDOW LIFTER OF A MOTOR VEHICLE

CROSS-REFERENCE TO RELATED APPLICATIONS

This application is the U.S. National Phase of PCT Application No. PCT/EP2017/083474 filed on Dec. 19, 2017, which claims priority to German Patent Application No. DE 20 2016 107 095.3, filed on Dec. 19, 2016, the disclosures of which are hereby incorporated in their entirety by reference herein.

TECHNICAL FIELD

The present disclosure relates to a rail slider for a cable-type window lifter of a motor vehicle.

BACKGROUND

Rail sliders may include a base member which is constructed in such a manner that it at least partially engages round the guide rail of the cable-type lifter in order to be displaceably supported thereon and to guide the window pane between the upper and lower stop position thereof. There are connected to the base member legs of the rail slider which form a receiving gap for the window pane, wherein the locking hook is constructed on a leg which can be resiliently deformed transversely with respect to the pane surface.

SUMMARY

One or more objects may be achieved with a rail slider described below. The characterizing features describe the geometric relationships according to one or more embodiments between different portions of the rail slider.

The rail slide may include a base member having guiding faces for the guide rail of the cable-type window lifter and a curved retention member which is connected via a base to the base member in a resilient manner and which has a locking hook which is arranged at the upper end. The curved retention member has two lateral webs which are connected to the base and a transverse connection element which carries the locking hook.

A ratio of the clear width between the inner faces of the lateral webs of the curved retention member and the spacing between the stop face of the lower edge of the window pane, on the one hand, and the stop face of the locking hook, on the other hand, assuming a maximum value of 1.2, such as a maximum value of 1.0, and/or the ratio of the clear width between the inner faces of the lateral webs of the curved retention member and the lever length between the base-side virtual pivot axis of the curved retention member, on the one hand, and the stop face of the locking hook, on the other hand, assuming a maximum value of $Z2a/Z3a \leq 0.5$, and the transverse connection element of the curved retention member being constructed substantially in a curved manner, at least at the inner side of the transverse connection element.

In one or more embodiments, a contour of the inwardly directed curve of the transverse connection element does not contain any linear segments which are longer than 0.3 times, such as not longer than 0.2 times, the width of the lateral webs. As another example, the contour of the outwardly directed curve of the transverse connection element also does not contain any linear segments which are longer than 0.2 times, such as not longer than 0.1 times the width measured over the outer faces of the webs.

The base-side virtual pivot axis of the curved retention member is intended to be understood to be an axis which is produced as a result of a resilient deformation of the lateral webs in the region of the connection of these webs to the base of the rail slider. The virtual pivot axis thus does not represent an axis which is intended to be precisely located; however, its position may be logically limited to a cross-section of the base.

A rail slider with the above-described geometric proportions according to one or more embodiments ensures, on the one hand, the resilience required for a good capacity for assembly and, on the other hand, increased mechanical strength, in particular being able to transmit an increased pull-off force, wherein at the same time the required material use can be reduced. The proportions and contours according to one or more embodiments may enable a harmonious force path from the locking element in the upper region of the arched curved member, via the lateral webs into the base which is connected to the base member and to which the webs are articulated. These geometric proportions also counteract a torsion of the lateral webs and consequently a pivoting outward of the locking hook under load. Consequently, it is possible to significantly improve the load-bearing capacity of the rail slider without notably limiting the resilient properties which are required for a good assembly capacity.

According to one or more embodiments, within the clear width of the curved retention member (spacing between the inner edges of the lateral webs) there is arranged a base piece which is connected to the base and which forms for the lower edge of the window pane a stop face facing away from the base. This structural feature enables the reinforcement ribs extending along the lateral webs to be continuously redirected in the region of the base at the bottom and thus to extend into the base piece. The force path is thereby discharged or introduced in a targeted manner and undesirable bending effects in the lateral webs are counteracted. The width of the base piece which is connected to the base should be a maximum of half the width measured over the outer faces of the lateral webs.

According to another embodiment, the clear width between the outwardly facing faces of the base piece and the associated inwardly facing faces of the lateral webs is at least as large as the width of the lateral webs. A compact construction is thereby produced whilst at the same time increasing the load-bearing capacity of the resilient curved retention member.

The curved construction of the transverse connection element which bridges the lateral webs should with the inner and/or outer contours thereof ideally substantially correspond to the shape of a parabola or another exponential mathematical function. The tangents at the ends of the relevant contour portions which represent an exponential function extend in this instance substantially orthogonally to each other. In other words: one tangent at an end of the curved contour extends substantially orthogonally relative to the displacement direction and the other tangent at the other end of the curved contour extends substantially parallel with the displacement direction.

An ideal redirection of the vertically extending (that is to say, downwardly facing) pull-off force which has to be absorbed by the locking hook into the lateral webs of the curved retention member is thus ensured. The tendency toward undesirable occurrences of torsion and bending of the load-bearing components is thus minimized.

At this point, it should be noted that comparably good results can also be achieved when the continuous contour path according to an exponential function is completely or partially replaced by a so-called polygon course in which the contour portions are thus composed completely or partially from a large number of linear portions. The angles between adjacent portions of the polygon are intended to be no smaller than 75 degrees, such as no smaller than 80 degrees.

The side walls of the lateral webs are typically constructed as reinforcement ribs. In one or more embodiments, these reinforcement ribs merge in the region of the base into horizontally extending reinforcement ribs. In this instance, the outer reinforcement ribs are connected to each other, whilst the inner reinforcement ribs of the webs merge or are redirected into reinforcement ribs of the inner base piece. In addition, there is used a reinforcement rib which is arranged between the side walls of the webs and which is also redirected in the region of the base into a horizontally extending reinforcement rib and finally runs into a central region of the base piece in the direction of the stop for the lower edge of the pane.

The described reinforcement ribs of the lateral webs may be connected a plurality of transverse ribs which stand at an angle of 70-90 degrees on the connection faces of the reinforcement ribs. The density of the transverse ribs is in the region of the curved transverse connection element (21*a*) significantly higher than, in particular more than twice as high as in the linearly extending region of a web (in the pull-off direction). The mechanical load-bearing capacity of the transverse connection element is thus increased and the resilience necessary for a simple blind assembly of the rail slider is not limited unnecessarily.

BRIEF DESCRIPTION OF THE DRAWINGS

The invention is explained in greater detail below with reference to an embodiment and the associated Figures. In the drawings.

DETAILED DESCRIPTION

Figure 1C:
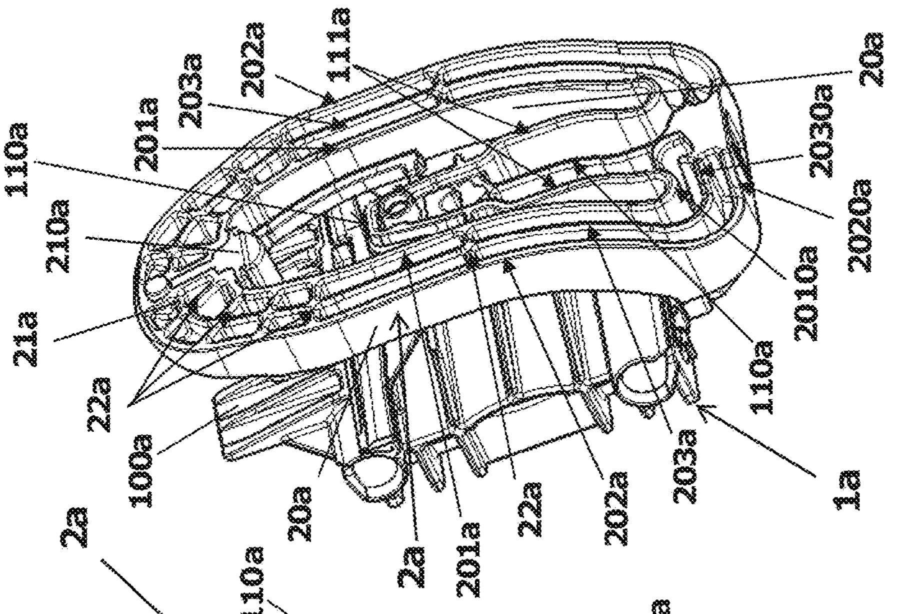
FIG. 1*c* is a perspective illustration of the rail slider according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An exemplary rail slider is disclosed in EP 0 208 237 B1. Although it enables a connection which is simple and cost-effective to produce between the window pane and the rail slider, the single leg which carries the locking hook has only a very limited mechanical strength. This leads, in the event of higher pull-off forces which occur in particular when panes which are frozen to a door frame are released, occasionally to release of the connection of the pane and rail slider.

DE 10 2012 223 825 A1 discloses an improved rail slider which has between two lateral resilient webs a transverse connection element which centrally carries a locking hook. Although this construction is substantially more robust, in the event of high mechanical loads torsions of the lateral webs which are connected to the base of the rail slider may occur, which promotes an unscrewing movement of the locking hook from the pane hole.

DE 4423440 A1 sets out a rail slider which—in kinematic reversal to the previously described constructions—has a locking element which is arranged in a pane hole and associated locking openings in the legs which form a gap for receiving the window pane. In this instance, the two legs which are arranged laterally and which carry the transverse connection element are kept extremely short and therefore very torsion-resistant. Instead, the cutout which extends below the transverse connection element and which is connected to the locking opening forms a pivot axis for the transverse connection element in order to be able to ensure a pivoting of the transverse connection element for the purposes of engagement of the locking element which is supported on the pane. When a so-called pull-off force acts, the pivotable transverse connection element is supported on the window pane. The mechanical load-bearing capacity of the rail slider is thus not (primarily) determined by the resilience of lateral webs, but instead by the tensile strength of the material which connects the transverse connection element to the legs and which forms the said pivot axis of the transverse connection element. Although the mechanical strength of this structural variant is comparatively good, not least as a result of the distribution of the pull-off forces over two legs at both sides of the window pane, the preassembly of the locking element in the pane hole requires significant additional complexity. In addition to this there are increased requirements when introducing the window pane which is provided with the locking element into the narrow slot of the door shaft.

One or more objects of the present disclosure is to develop a structural configuration of a foldable plastics material rail slider in such a manner that the mechanical strength thereof is improved, but without notably impairing its capacity for assembly at the expense of the flexibility of the lateral legs which is required for this purpose. The present disclosure may provide for an easy or simple capacity for assembly of the rail slider on the window pane, a high degree of flexibility would be advantageous, whilst the transmission of significant pull-off forces requires a high degree of rigidity of the rail slider.

Figure 1B:
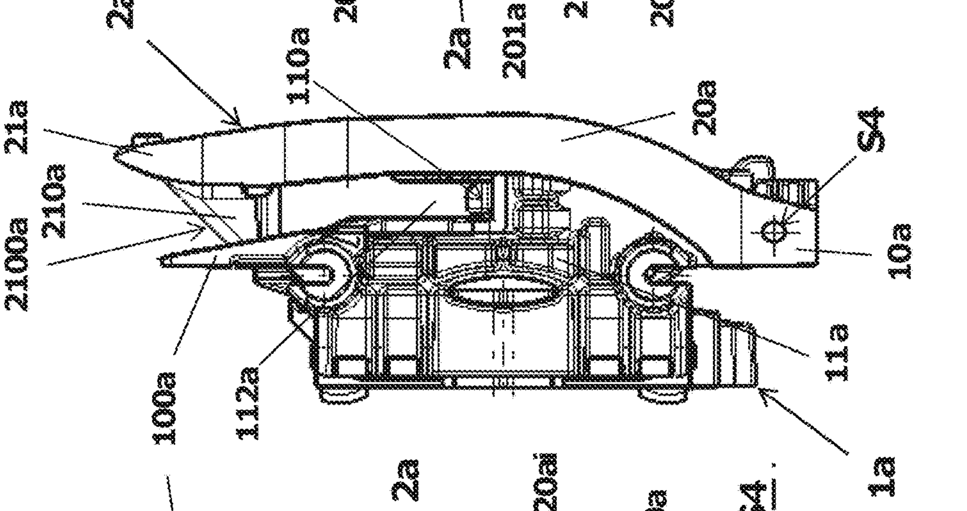
FIG. 1*b* is a side view of the rail slider according to one or more embodiments.
Figure 1A:
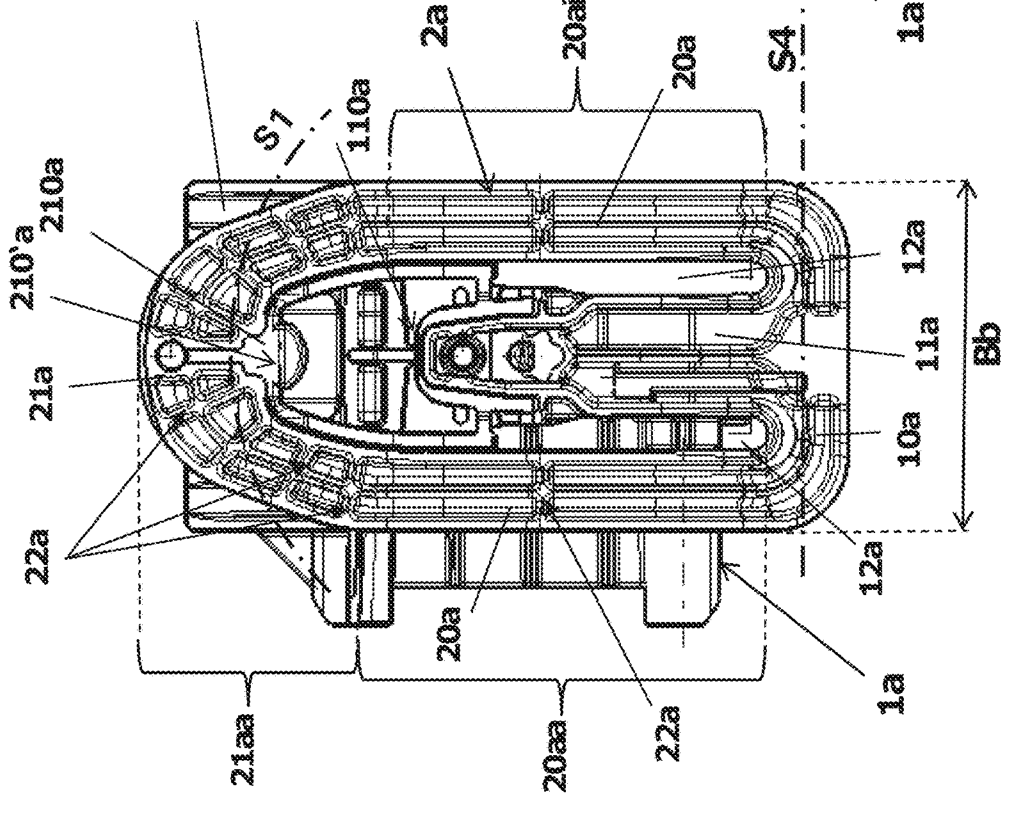
FIG. 1*a* is a plan view of a rail slider according to one or more embodiments from the side of the curved resilient member.
Figure 3A:
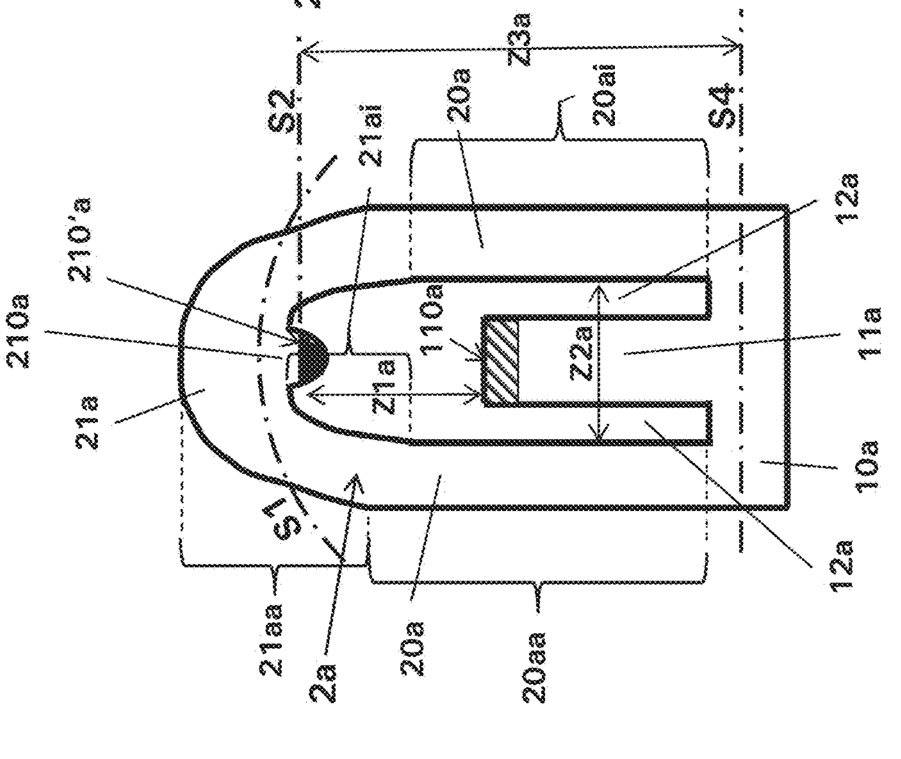
FIG. 3*a* is a schematic illustration of a curved resilient member according to one or more embodiments with a curved transverse connection element.
Figures 4A, 4B:
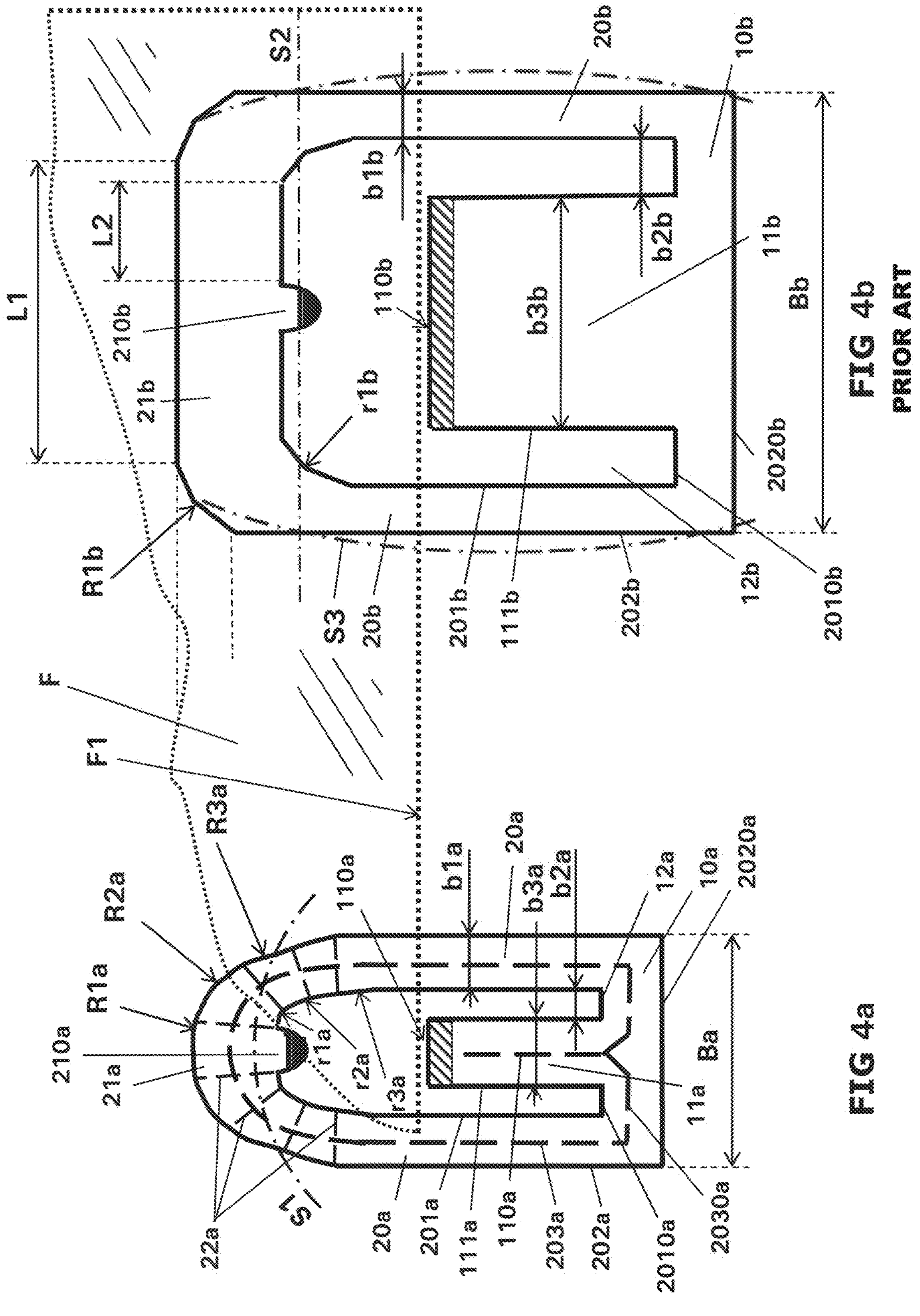
FIG 4b PRIOR ART
FIG. 4*a* is a schematic illustration of a curved resilient member according to one or more embodiments with a curved transverse connection element and additional reinforcement ribs between the lateral reinforcement ribs of the curved member.
FIG. 4*b* is a schematic illustration of a known curved resilient member with a substantially linear transverse connection element.

In FIGS. 1a-1c different views of the rail slider according to one or more embodiments are illustrated. Schematic illustrations of details according to one or more embodiments are shown in FIGS. 3a and 4a. In order to understand the following detailed description, it will generally be necessary to refer to these Figures together since the large number of reference numerals could not be combined in a single Figure.

This applies similarly to the description of the previously known prior art which is illustrated as different views in FIGS. 2a, 2b, 3b and 4b. The detailed comparison of one or more embodiments and an example selected from the prior art is intended to help to provide understanding of the central notion of the present disclosure.

FIGS. 1a-1c show a rail slider with a base member 1a which has guiding slots for the engagement of a guide rail (both not illustrated) in order to displace the rail slider with an F mounted thereon along a predetermined path. The window pane F is supported in a gap 112a which, on the one hand, is delimited by a leg 100a which is formed on the base member 1a and, on the other hand, by the curved retention member 2a which may include two lateral webs 20a and the curved transverse connection element 12a. Via the lower regions of the lateral webs 20a, the curved retention member 20a is connected to a base 10a. This base 10a is the lowest portion of the base member 1a to which there is also connected the base piece 11a whose upper end forms a stop 110a for the lower edge F1 of the window pane F.

Via the lateral webs 20a which are constructed in a resilient manner, the curved transverse connection element 21a is pressed against the associated surface of the window pane F, wherein the locking hook 210a which is formed on the transverse connection element 21a is also retained in engagement with the assembly opening (not illustrated) in the window pane F. In order to connect the window pane F to the rail slider, the window pane F is pressed with the lower edge F1 thereof onto the inclined introduction wedge face 2100a, wherein the pane F being supported on the leg 100a presses the resiliently deformable lateral webs 20a outward until the locking hook 210a is supported on the surface of the pane F. When the assembly opening in the window pane F is reached, the locking hook 210a engages.

In order to solve one or more of the above-mentioned problems, such as to increase the mechanical strength whilst maintaining a good capacity for assembly and at the same time reducing the material requirement, the following geometric relationships may be as described below.

The relationship of the clear width Z2a between the inner faces of the lateral webs 20a of the curved retention member 2a and the spacing Z1a between the stop face 110a of the lower edge F1 of the window pane F, on the one hand, and the stop face 210'a of the locking hook 210a, on the other hand, should assume at a maximum the value Z2/Z1≤1.2, this value may be less than 1.0.

According to one or more embodiments, the relationship between the clear width Z2a between the inner faces of the lateral webs 20a of the curved retention member 2a and the lever length Z3a of the base-side virtual pivot axis S4 of the curved retention member 2a, on the one hand, and the stop face 210'a of the locking hook 210a, on the other hand, assumes at a maximum the value Z2a/Z3a≤0.5. This relationship may, however, also be used as an alternative to the above relationship Z2/Z1.

The base-side virtual pivot axis S4 of the curved retention member 2a is not intended to be understood to be an axis which can be precisely located, but instead an axis which is produced in the event of resilient deformation of the lateral webs 20a in the region of the connection of these webs 20a to the base 10a of the rail slider.

The transverse connection element 21a of the curved retention member 2a is substantially constructed in such a curved manner that:

the curve which faces outward and which is composed of the radii R1a, R2a, R3a has no linear segments L1 which are longer than 0.2 times the width Ba measured over the outer faces of the webs 20a (thus: L1/B≤0.2); such as, less than 0.1; and the curve which faces inward and which is composed of the radii r1a, r2a, r3a has no linear segments L2 which are longer than 0.3 times the width b1a of the lateral webs 20a (L2/b1≤0.3); as one example, the value L2/b1a is less than 0.2.

See also in this regard the schematic illustrations of FIGS. 3a and 4a.

Figure 2B:
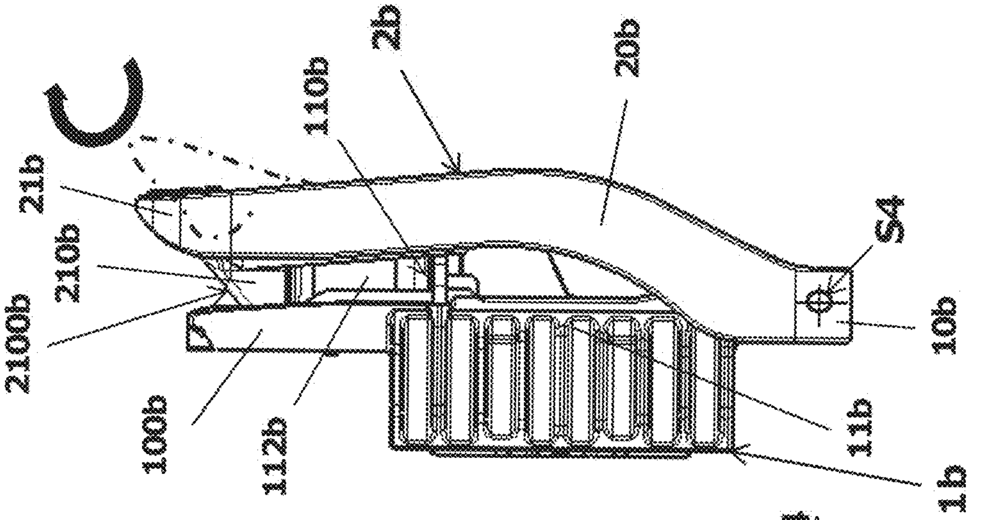
FIG 2b PRIOR ART
FIG. 2*b* is a side view of the previously known rail slider.
Figure 2A:
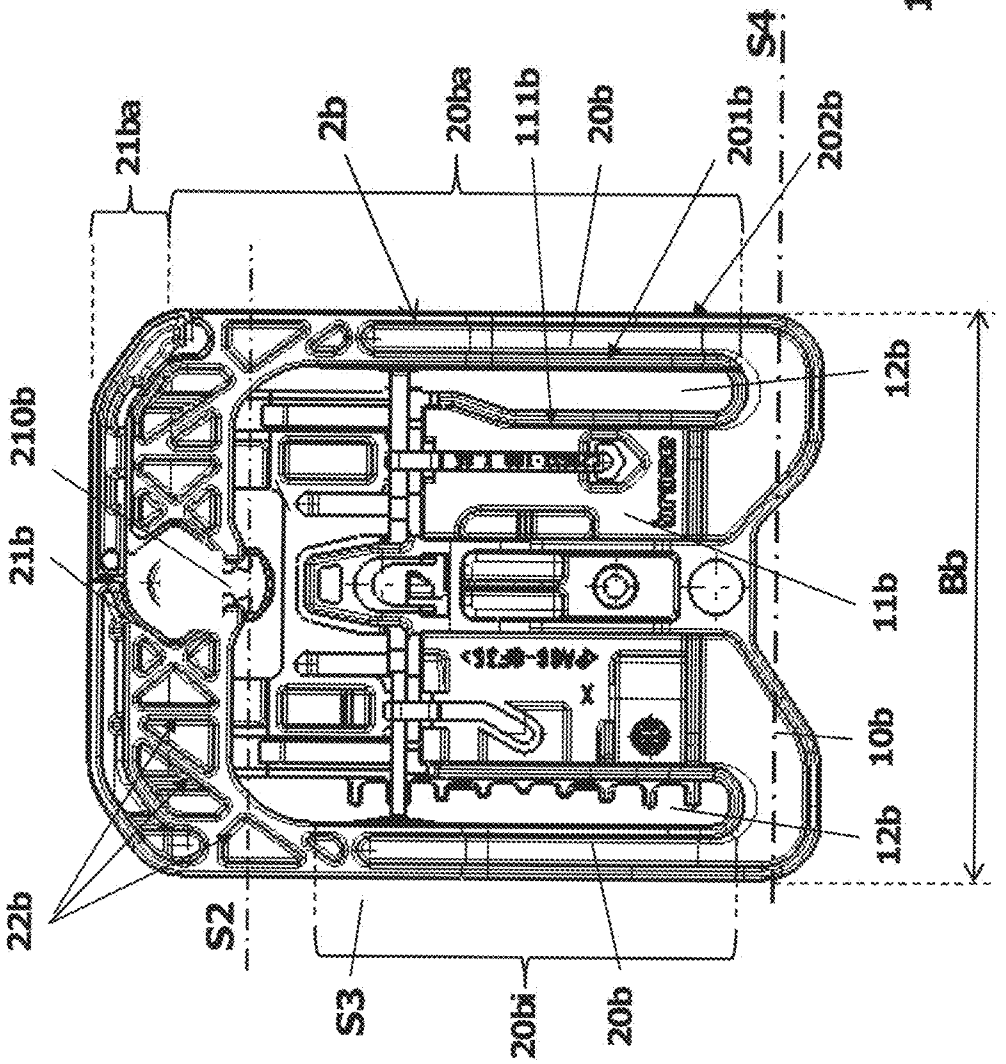
FIG 2a PRIOR ART
FIG. 2*a* is a plan view of a previously known rail slider from the side of the curved resilient member.
Figure 3B:
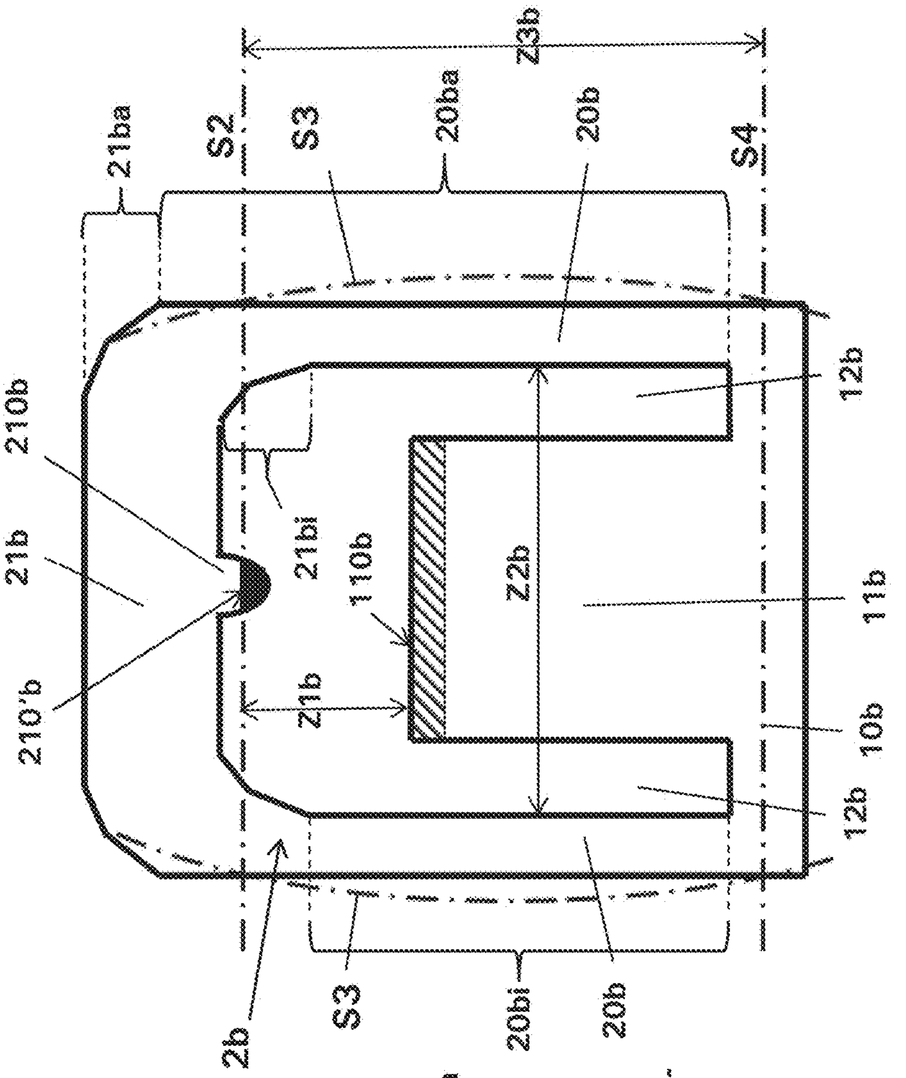
FIG 3b PRIOR ART
FIG. 3*b* is a schematic illustration of a known curved resilient member with a substantially linear transverse connection element.

If the geometric proportions described above are compared with the corresponding proportions of the rail slider which belongs to the previously known prior art according to FIGS. 2a, 3b and 4b, it is possible to determine that there are considerable qualitative and quantitative differences. Since the reference numerals were selected to strictly correspond to the reference numerals used for the description of FIGS. 1a-1c, 3a and 4a, it is not necessary to repeat the explanation of the general construction of the embodiment in relation to the prior art. The suffix "a" always relates to the invention and the suffix "b" stands for reference numerals for the embodiment from the prior art. Only the significant differences are therefore discussed.

The schematic illustrations of FIGS. 3b and 4b relating to the prior art clearly show that the transverse connection element 21b which bridges the lateral webs 20b is dominated by linear portions L1, L2. Only the edge-side transition regions to the lateral webs 20b are provided with curved contours. This leads in the event of a load acting on the locking hook 210a as a result of the applied lever relationships not only to a pivot movement of the transverse connection element 21b about the virtual axis S2. It also promotes with the sizing given a torsion of the resiliently constructed lateral webs 20b (indicated by the virtual torsion axis S3), whereby the tendency of the transverse connection element 21b to pivot or pivot outward is further increased. As a result, there is an increased risk of the locking hook 210b slipping out of the assembly opening of the window pane.

The introduction and transmission of the forces within the rail slider is, however, also influenced by the unfavorable relationships of the linear lengths 20ba, 20bi of the outer or inner portions of the lateral webs 20b in comparison with the heights 21ba, 21bi of the outer or inner curved portions of the transverse connection element 21b. The relationship is in this instance (that is to say, in the prior art) in the order of magnitude of approximately 20b/21b=5 . . . 8. In one or more embodiments, these relationships are as a result of the pronounced curved contour in the range of only 2 . . . 3.

For a construction of the rail slider which saves material and space, but at the same time also has good load-bearing capacity, the width b3a of the base piece 11a which is connected to the base 10a should be a maximum of half the size of the width Ba measured over the outer faces of the webs 20a. At the same time, the clear width b2a between the outwardly facing face of the base piece 11a and the inwardly facing face of the associated web 20a, on the one hand, and the width b1a of the webs 20a should assume at a maximum the value 0.5. Sufficient space remains to form the stop face 110*a* for the lower edge F1 of the window pane F on the base piece 11*a*.

As already set out, the effectiveness of the rail slider is to construct the transverse connection element 21*a* as a curved structure. At least the inner contour between the locking hook 210*a* and the substantially linearly extending regions of the lateral webs 20*a* (that is to say, in the region of the radii r1*a*, r2*a*, *r*3*a*) is constructed in a curved manner. As one example, the curved inner and/or outer contours of the transverse connection element 21*a* may be constructed in a substantially parabolic manner or correspond to the path of another exponentially mathematical function, wherein the tangents at the ends of the relevant contour portions extend substantially orthogonally with respect to each other. Ultimately, this means that one tangent at one end of the curved contour (that is to say, in the region of the locking hook 21*a*) extends substantially orthogonally to the displacement direction and the other tangent at the other end of the curved contour (that is to say, at the transition to the linear region of the lateral web 20*a*) extends substantially parallel with the displacement direction. Consequently, there is produced a continuous force path without force peaks as far as the base 10*a*.

As a another example, a variant may include contour portions r1*a*, r2*a*, *r*3*a* or R1*a*, R2*a*, R3*a* that may be completely or partially composed from polygonal portions, wherein the angles between adjacent portions of the polygon course are intended to be not less than 75 degrees, such as not less than 80 degrees.

Typically, the side walls of the webs 20*a* are constructed as reinforcement ribs 201*a*, 202*a* which form via a common connecting side wall a U-shaped cross-section of the web 20*a*. These reinforcement ribs 201*a*, 202*a* change their direction in the region of the base 10*a* and ultimately run horizontally into the reinforcement ribs 2010*a*, 2020*a*. Consequently, the outer reinforcement ribs 202*a* which extend to the lower edge of the rail slider combine to form a common reinforcement rib 2020*a* on the base 10*a*, whilst the inner reinforcement ribs via the reinforcement ribs 2030*a* on the base run into rising reinforcement rib 111*a* of the base piece 11*a*.

In order to further improve the mechanical strength, at least one additional reinforcement rib 203*a* may further be arranged between the edge-side reinforcement ribs 201*a*, 202*a* of the webs 20*a*, wherein this reinforcement rib 203*a* is also redirected in the region of the base 10*a* into a horizontally extending reinforcement rib (2030*a*).

In order to further stabilize the curved transverse connection element 21*a* which carries the locking hook 210*a*, a plurality of transverse ribs 22*a* are provided so that the reinforcement ribs 201*a*, 202*a*, 203*a* of the webs 20*a* are connected to each other in a net-like manner by the transverse webs 22*a*. The transverse ribs 22*a* should stand at an angle of 70-90 degrees on the connection faces of the reinforcement ribs 201*a*, 202*a*, 203*a*. The density of the transverse ribs 22*a* in the region of the curved transverse connection element 21*a* is clearly higher than in the linear region of the webs 20*a*, in particular the density is more than twice as high.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE NUMERALS

1*a*, 1*b* Base member
10*a*, 10*b* Base
11*a*, 11*b* Base piece
12*a*, 12*b* Recess
100*a*, 100*b* Leg (at side of the base member)
110*a*, 110*b* Stop for lower edge of window pane
111*a*, 111*b* Reinforcement rib on the base piece
112*a*, 112*b* Gap for receiving pane
2*a*, 2*b* Curved retention member
20*a*, 20*b* Lateral webs
20*aa*, 20*ba* Length of the linear, vertically extending outer portion of the leg
20*ai*, 20*bi* Length of the linear, vertically extending inner portion of the leg
21*a*, 21*b* Transverse connection element
21*aa*, 21*ba* Height of the outer curved portion of the transverse connection element
21*ai*, 21*bi* Height of the inner curved portion of the transverse connection element
22*a*, 22*b* Transverse ribs
201*a*, 201*b* Reinforcement rib
202*a*, 202*b* Reinforcement rib
203*a* Reinforcement rib
210*a*, 210*b* Locking hook
210'*a*, 210'*b* Contour of the locking hook
2010*a*, 2010*b* Short reinforcement rib, base side
2020*a*, 2020*b* Central reinforcement rib, base side
2030*a* Long reinforcement rib, base side
2100*a*, 2100*b* Introduction wedge face
Ba, Bb Outer width
b1*a*, b1*b* Width of the lateral webs
b2*a*, *b*2*b* Clear width between web and base piece
b3*a*, *b*3*b* Width of the base piece
F Window pane
F1 Lower edge of the window pane
L1 Length of a linear portion on the outer contour
L2 Length of a linear portion on the inner contour
R1*a*, R1*b* Radius of a portion on the outer contour
R2*a* Radius of a portion on the outer contour
R3*a* Radius of a portion on the outer contour
r1*a*, r1*b* Radius of a portion on the inner contour
r2*a* Radius of a portion on the inner contour
r3*a* Radius of a portion on the inner contour
S1 Pseudo pivot axis
S2 Virtual pivot axis, locking hook side
S3 Virtual torsion axis
S4 Virtual pivot axis, base side
Z1*a*, Z1*b* Spacing between stop faces
Z2*a*, Z2*b* Clear width between the inner faces
Z3*a*, Z3*b* Lever arm length

The invention claimed is:

1. A rail slider for use in a window regulator provided with a guide rail for use in a motor vehicle, the rail slider comprising:

a base member configured to move along and engage the guide rail;
a retaining bracket including,
a base connected to the base member,
a first lateral web and a second lateral web extending from the base and configured to deflect about a first pivot axis defined by the base, a transverse connecting element, extending between the first lateral web and the second lateral web, wherein the base, the first lateral web, the second lateral web, and the transverse connecting element collectively define a recess, a base piece extending from the base and forming a stop surface facing away from the base and configured to engage a lower edge of a windowpane, and a locking hook extending into the recess from the transverse connecting element and provided with a contour, wherein the contour and the stop surface are spaced apart by a first distance Z2*a* and inner surfaces of the first lateral web and the second lateral web are spaced apart by a second distance Z2*a*, wherein $Z2a/Z1a \leq 1.2$, wherein the first pivot axis and the stop surface are spaced apart by a third distance Z3*a*, wherein $Z2a/Z3a \leq 0.5$, and wherein the transverse connecting element includes an inner periphery provided with a first number of linear segments and a first number of radii, the first lateral web has a first width b1*a*, and the first number of linear segments have a linear length L2 that is less than or equal to thirty percent of the first width b1*a*.

2. The rail slider of claim 1, wherein:

$Z2a/Z1a \leq 1.0$, and $Z2a/Z3a \leq 0.4$.

3. The rail slider of claim 1, wherein an outer periphery of the transverse connection element is curved and includes a second number of linear segments and outer surfaces of the first lateral web and the second lateral web are spaced apart by a second width Ba, wherein the second number of linear segments have a linear length L2 that is less than or equal to twenty percent of the second width Ba.

4. The rail slider of claim 1, wherein outer surfaces of the first lateral web and the second lateral web are spaced apart by a second width Ba and the base piece has a third width b3*a* that is less than or equal to fifty percent of the second width Ba.

5. The rail slider of claim 4, wherein an outer periphery of the base piece and an inner periphery of the second lateral web are spaced apart by a fourth width b2*a*, wherein the fourth width b2*a* is less than or equal to the first width b1*a*.

6. The rail slider of claim 1, wherein at least one of an inner periphery or an outer periphery of the transverse connection element is substantially shaped as a parabola, wherein tangents at ends of the inner and outer peripheries extend substantially orthogonally with respect to each other.

7. The rail slider of claim 6, wherein the inner and outer contour peripheries are at least partially formed of polygonal portions, wherein angles between adjacent portions of the polygonal portions are greater than or equal to 75 degrees.

8. The rail slider of claim 6, wherein one tangent at an end of either the inner or outer peripheries extends substantially orthogonally to a displacement direction and another tangent at another end of the inner or outer peripheries extends substantially parallel to the displacement direction.

9. The rail slider of claim 1, wherein side walls of the webs are formed of a first number of reinforcement ribs and the base includes a second number of reinforcement ribs connected to the first number of reinforcement ribs.

10. The rail slider of claim 9, wherein a first reinforcement rib of the first number of reinforcement ribs includes a first portion, extending a vertical direction, and a second portion horizontally extending into the base.

11. The rail slider of claim 10, wherein the first reinforcement rib and a second reinforcement rib of the first number of reinforcement ribs are connected to one another by a plurality of transverse ribs and form an angle between the plurality of transverse ribs and the first reinforcement rib that ranges between 70 and 90.

12. The rail slider of claim 11, wherein the transverse connection element includes a first density of the plurality of transverse ribs and the first lateral web includes a second density of the plurality of transverse ribs and the first density is greater than the second density.

13. The rail slider of claim 1, wherein:

$L2/b1a \leq 0.3$.

14. A rail slider for a motor vehicle window lifter configured to adjust a window pane, the rail slider comprising:

a base member configured to engage and move along a guide rail of the window lifter; and a retaining bracket connected to the base member and including, a base, a transverse connection element, a locking hook extending from the transverse connection element and configured to engage an opening defined by the window pane, a pair of lateral webs extending from the base and terminating at the transverse connection element, wherein the base, the pair of lateral webs, and the locking hook form a recess, a base piece extending from the base into the recess, wherein the locking hook includes a first stop face that extends into the recess and a distal end of the base piece includes a second stop face, wherein the first stop face and the second stop face are spaced apart by a first distance Z1*a*, wherein the pair of lateral webs are spaced apart by a second distance Z2*a*, $Z2a/Z1a \leq 1.0$.

15. The rail slider of claim 14, wherein the transverse connection element is U-shaped.

16. The rail slider of claim 15, wherein the transverse connection element includes a linear segment that has a length L2, wherein the one of the lateral webs has a width (b1*a*), and wherein the length L2 is less than or equal to thirty percent of the width (b1*a*).

17. The rail slider of claim 16, wherein outer portions of the pair of lateral webs have a width Ba, wherein the base piece has a width b3*a* that is less than or equal to half of the width Ba.

18. The rail slider of claim 17, wherein the base piece and at least one of the pair of lateral webs are spaced apart from one another by a width b2*a*, wherein $b2a/b3a \leq 0.5$.

19. A rail slider for a motor vehicle window lifter configured to adjust a position of a window pane, the rail slider comprising:

a base member configured to engage and move along a guide rail of the window lifter; and a retaining bracket connected to the base member and including, a base, a transverse connection element, a locking hook extending from the transverse connection element and configured to engage an opening defined by the window pane, a pair of lateral webs extending from the base and terminating at the transverse connection element, wherein the pair of lateral webs are configured to elastically deflect about a base-side pivot axis, wherein the base, the pair of lateral webs, and the locking hook form a recess, a base piece extending from the base into the recess, wherein the locking hook includes a first stop face that extends into the recess, wherein the pair of lateral webs are spaced apart by a first distance $Z2a$, wherein the first stop face and the base-side pivot axis are spaced apart by a second distance $Z3a$, and wherein $Z2a/Z3a \leq 0.4$.

* * * * *